June 17, 1930.  C. HANSEN  1,764,442
TREE PROTECTOR
Filed Aug. 19, 1929
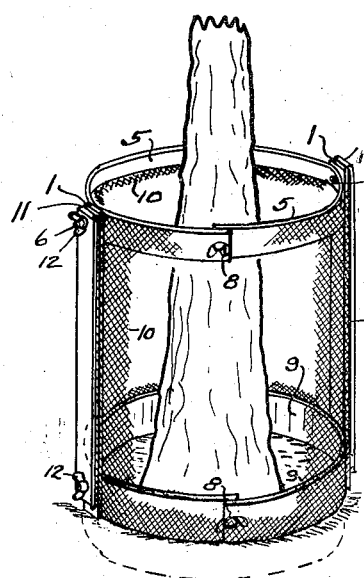
Fig. 1
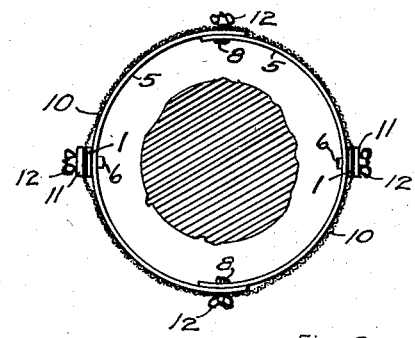
Fig. 2
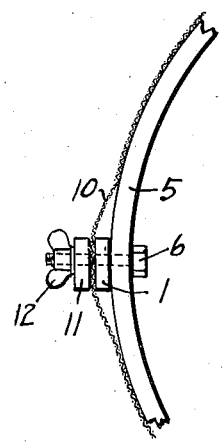
Fig. 3
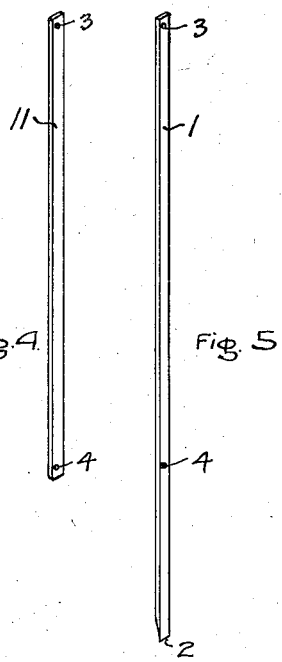
Fig. 4  Fig. 5
Fig. 6
Fig. 7
Inventor
Christian Hansen
By
Attorney Patented June 17, 1930

1,764,442

UNITED STATES PATENT OFFICE

CHRISTIAN HANSEN, OF PUYALLUP, WASHINGTON

TREE PROTECTOR

Application filed August 19, 1929. Serial No. 386,789.

This invention relates to devices adapted to surround trees, bushes and other objects, in order to protect them from cutworms, grubs and other larvæ, rabbits, cats and other animals.

The objects of my invention are to provide a suitable means of fastening a netting around the tree to be protected; suitable means for securing the ends of the netting together; and suitable means for bracing the structure thus formed to make it stiff and strong. A further object is to provide a device which may be quickly set up or taken down; which is practically indestructible; and which is cheap to make, easy to apply, and effective in use.

I attain these and other objects by the devices and arrangements illustrated in the accompanying drawings, in which—

Fig. 1 represents a tree protected by my device; Fig. 2 is a plan view thereof; Fig. 3 is an enlarged horizontal section of one of the supporting posts, showing the means for clamping the ends of the netting together and to the post; Figs. 4 and 5 are perspective views of the clamping bar and post respectively; Figs. 6 and 7 are views of the upper brace bar and the lower base plate, respectively.

Similar numerals of reference refer to similar parts throughout the several views.

Cutworms and other similar pests usually burrow into the ground to a depth of one or two inches during the day, and feed during the night. In order to protect a tree from these pests I prefer to clear away the dirt surrounding the tree for a sufficient depth to remove all the grubs, before applying my device in place, after which the dirt thus removed may be properly examined and such part as is not affected may be returned to the base of the tree on the inner side of my protecting screen, thus removing all such insects from the inside of the inclosure and preventing them from gaining access to the tree.

My protector comprises a set of two or more metal posts 1, each post being of suitable size and length (which may be about ¼ inch thick, ¾ inch wide, and say four feet in length) and having its lower end beveled off to form a point or a chisel edge 2 at the bottom. These posts 1 are arranged symmetrically around the tree, or other place to be protected, and are driven into the ground a suitable distance. The flat surface at the entering edge 2 of each post 1 tends to hold it firmly against forces applied to the upper end of the post and towards or away from the tree. These posts 1 are provided with upper and lower holes 3 and 4, through their flat sides, adapted to receive the bolts whereby the braces and the netting and the clamping bars are attached thereto.

The upper ends of the two posts 1 are each provided with brace strips or bars 5, made of similar material to said posts 1, and preferably bent on semi-circular arcs, and secured to the posts 1 by bolts 6 which pass through the center of said bars 5 and through the above mentioned holes 3 in the posts 1. The strips or bars 5 are provided with corresponding holes 7 in their ends. Bolts 8 pass through the holes in the two bars 5, which overlap each other, thereby securing them together into a ring-shaped brace secured at two opposite points to the two posts 1.

The lower ends of the two posts 1 are provided with wide metal base shield-plates 9, similarly curved into semi-circles and provided with holes whereby the similar bolts 6 and 8 secure them to the lower ends of the posts 1 and to each other into an enveloping shield ring. These shield plate rings 9 may be about six inches wide and may extend into the soil about three or four inches.

A netting 10, which should be a fine strong metal netting, is secured at one end to one of the posts 1 and extends from this post around the tree, on the outer side of the brace bars 5 and the shield-plates 9, and thus back to the said post 1.

Clamping bars 11 are fastened to the outer sides of the two posts 1, outside of the netting 10, by means of the above-mentioned bolts 6 and 8, which therefore pass through the rings formed by the bars 5 or the shield plates 9, the posts 1, netting 10, and clamp bars 11, whereby the several parts are secured together into a single structure and whereby the ends of the netting are pressed together, thus sealing the joint between the two ends of the netting 10 to prevent entrance of grubs between the said two ends.

Wing nuts 12 are preferably used on all the bolts, thus facilitating the taking down or settting up of my improved tree protector.

Thus it will be seen that the enclosure formed by my tree protector, which extends down into the ground a sufficient distance, cannot be entered by a grub either by passing under the solid metal shield-plate or by passing between the clamped ends thereof or of the netting, or through the netting itself, and that therefore the tree is fully protected from such pests. Also it will be understood that, since all the parts are firmly bolted together and the two posts are driven well into the ground, my improved tree protector cannot be easily dislodged or damaged and forms a single structure. Also it will be understood that the ring formed of the bars 5, and the shield-plate ring 9, hold the netting firmly in place and well separated from the tree enclosed therein.

Having described my invention, what I claim and desire to secure by Letters Patent is:—

1. A tree protector comprising a plurality of posts around the tree; brace-bars bent into arcuate form and secured together at their ends to form a ring, and secured to the upper ends of said posts; shield-plates bent into arcuate form and secured together at their ends to form a ring, and secured to the lower portions of said posts; netting extending around the tree and engaging the outer surfaces of the rings formed by said brace-bars and shield-plates to form an enclosure; and clamp bars secured to said posts and clamping the netting between them and said posts, whereby the netting is secured in place.

2. A tree protector, comprising a plurality of posts around the tree; brace-bars joining said posts and forming a ring around the tree; shield-plates joining the lower portions of said posts and forming a ring around the tree; netting extending around the tree and engaging the outer surfaces of the rings formed by said brace-bars and said shield-plates to form an enclosure; and clamp-bars secured to said posts and clamping the netting between them and said posts, whereby the netting is secured in place, and whereby the ends of the netting are clamped together.

3. A tree protector, comprising a pair of posts on opposite sides of the tree; semi-circular brace-bars secured to each other at their ends and to said posts and forming a ring around the tree; netting extending around the tree and engaging the outer surface of the ring formed of said brace-bars and extending therefrom into the ground to form an enclosure; and removable clamping means secured to said posts and clamping said netting thereto and clamping the ends of said netting together.

CHRISTIAN HANSEN.